United States Patent Office 3,850,963
Patented Nov. 26, 1974

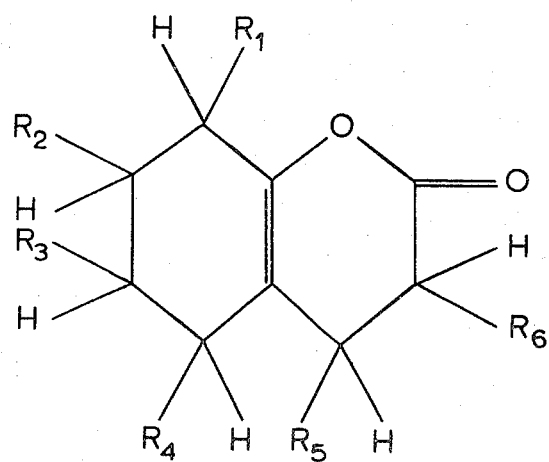

3,850,963
PREPARATION OF DIHYDROCOUMARIN AND OF ALKYL DERIVATIVES THEREOF
Jozef A. Thoma, Sittard, Johannes J. M. Deumens, Limbricht, and Egidius J. M. Verheijen, Sittard, Netherlands, assignors to Stamicarbon N.V., Heerlen, Netherlands
Filed Feb. 23, 1973, Ser. No. 335,114
Claims priority, application Netherlands, Feb. 26, 1972, 7202539
Int. Cl. C07d 7/26
U.S. Cl. 260—343.2 R
8 Claims

ABSTRACT OF THE DISCLOSURE

Dihydrocoumarin is produced by contacting hexahydrocoumarin with a dehydrogenation catalyst such as palladium at elevated temperatures, optionally in the presence of hydrogen, to produce the dihydrocoumarin which, in turn, may be converted to coumarin, a useful flavoring agent resembling vanilla beans. The alkylated hexahydrocoumarin compounds may also be processed according to the disclosed procedure to produce the corresponding alkyl-substituted products.

BACKGROUND OF THE INVENTION

The present invention relates to a process for the preparation of dihydrocoumarin and alkylated derivatives thereof, compounds which are useful as flavorings and odorants.

As described in U.S. Patent 3,442,910 in the name of Thweatt these compounds can be prepared by the simultaneous cyclization and dehydrogenation of the lower alkyl esters of 2-oxo-cyclohexane propionic acid and its alkylated derivatives, in the presence of a catalyst and at elevated temperature.

According to this known process, however, there is the practical disadvantage of having as starting materials very expensive compounds and further a complex conversion procedure as will be apparent from the description of the process in said patent.

A further disadvantage of the Thweatt process is that the processing of the reaction mixture so obtained is somewhat complicated in that besides the main product the alcohol formed from the ester group is also recovered.

According to said patent also the ketoacid itself can be used as a starting compound for the simultaneous cyclization and dehydrogenation. This would mean a significant improvement because the ketoacid (see, for instance, U.S. Pat. 2,850,519) can be prepared in a simple manner. In practice, however the efficiency of a conversion of this kind is so low that this use of the ketoacid is of no practical importance.

At column 1, lines 62–66 the Thweatt patent states that hexahydrocoumarin, such as produced by the cyclization of oxocyclohexane propionate, cannot be dehydrogenated to hydrocoumarin using the metal catalysts and reaction conditions of said process.

DESCRIPTION OF THE INVENTION

The present invention provides a process in which the above and other disadvantages are obviated, for we have surprisingly found that for the preparation of dihydrocoumarin and the alkyl-substituted derivatives thereof, hexahydrocoumarin, which is the lactone of the enol form of 2-oxocyclohexane propionic acid, respectively the alkyl-substituted derivatives thereof, can very suitably be used as starting materials, a discovery not predictable from statements made in the literature, as mentioned above.

The process according to the present invention is characterized in that a compound selected from the group consisting of hexahydrocoumarin and alkylated derivaties of hexahydrocoumarin conveniently represented by the formula:

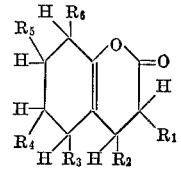

in which each of the $R_1$ through $R_6$ independently represents hydrogen or a lower alkyl group provided that the total number of carbon atoms of the substituents $R_1$–$R_6$ is at most 10, is contacted at elevated temperature with a dehydrogenation catalyst and the dehydrogenated product dihydrocoumarin or its alkyl substituted derivative is recovered from the resulting reaction mixture.

The starting products in the process according to the present invention are prepared in the known manner by converting the ketoacid into the corresponding lactone as described in Zhurn. Obschei Khim. vol. 26, 1965, pages 861–865, the disclosure of which is hereby incorporated by reference.

As used herein lower alkyl designates an alkyl, straight chained or branched, having from about 1–4 carbon atoms, such as methyl, ethyl, propyl, isopropyl, butyl, t-butyl and isobutyl. As used herein reference to dihydrocoumarin and hexahydrocoumarin include the alkylated derivatives thereof as well.

The process according to the present invention can very suitably be carried out in the gas phase optionally in the presence of inert diluent gases. The liquid phase may also be used if desired, however, this approach is less attractive because the efficiency is somewhat lower, so the gas phase reaction is preferred.

In the process according to the invention the starting product to be dehydrogenated is preferably brought into contact with the catalyst in the presence of hydrogen for as we have observed the catalyst remains active much longer when hydrogen is also applied. The amount of hydrogen will vary, but generally 1–15 moles of hydrogen are used for every mole of product to be dehydrogenated.

According to our process the temperature may be varied within wide limits, for instance between 150 and 400° C., however within the temperature range of 175–325° C. the efficiency appears to be particularly favorable, so that this temperature range is the most suitable in practice hence is preferred. The pressure of the reaction does not constitute a critical variable so that superatmospheric pressures up to e.g. 100 atm. may be used. For convenience we prefer to use atmospheric pressure.

Metal dehydrogenation catalysts are used according to the process of the present invention, for instance a metal from the 8th group or the 1st side group of the Periodic System of Elements according to Mendeleev, or a compound of such a metal. Generally, however, for convenience and correct practice a noble metal or nickel or cobalt will be used. Preferred are palladium, platinum and nickel or a compound of these metals. Usually the catalysts are as used on a carrier such as silica gel, aluminum oxide, magnesium oxide and mixtures of these or other carriers. Aluminum oxide is highly suitable as a carrier and is thus preferred.

The ratio between the material to be dehydrogenated and the catalyst can be varied. In the gaseous phase, for example, usually from 0.01 to about 2.0 grams of material to be dehydrogenated is used per milliliter catalyst per hour.

Various embodiments of the process according to the present invention are possible. We have found that a particularly suitable embodiment for large-scale application is the method in which the starting compound is diluted in the gaseous state with an inert gas, such as nitrogen and carbon dioxide, and in which the gas mixture, optionally containing hydrogen, is contacted with the catalyst in the form of a fixed bed or of a so-called fluid bed.

In the process according to the present invention the contact with the catalyst may be maintained until complete conversion of the lactone to be dehydrogenated has been achieved. Preferably, however, the said contact is interrupted before a complete conversion has been achieved, because then a higher efficiency can be obtained. We have found that the conversion appears to decrease slightly, other conditions being the same, as the catalyst is being used over a longer period of time. Percent of conversion of the starting compound will usually range from 40 to about 99 percent. The non-converted starting product can be easily separated off by fractional distillation of the condensate obtained by cooling of the reaction mixture and after separation it is conveniently recirculated. Any by-products that have incidently formed can be recovered by this fractional distillation, like ortho-ethylphenol and coumarin if hexahydrocoumarin is the starting product.

The dihydrocoumarin or alkylated dihydrocoumarin product obtained according to the invention may, if desired, be further dehydrogenated to coumarin or alkylated coumarin as described for example, in U.S. Pat. 3,442,910, the disclosure of which is hereby incorporated by reference. Coumarin has a pleasant, fragrant odor resembling that of vanilla beans and is useful as a flavoring agent and as an odorant in the perfume industry.

The invention will be further illustrated by the following non-limiting examples and unless otherwise indicated all parts and percentages are by weight.

Example 1

A gaseous mixture of hexahydrocoumarin, hydrogen and nitrogen (6.47 moles of hydrogen and 25.87 moles of nitrogen to every mole of hexahydrocoumarin) was for 501 hours and at atmospheric pressure, passed through, from the top to the bottom of, a vertical tubular reactor (diameter 18 mm., length 400 mm.) at elevated temperature as indicated in the following table. The reactor was provided with a heating jacket and the reactor also contained a catalyst bed of 50 milliliters between two zones, 30 ml. each, of inert ceramic material. Prior to introduction the gaseous mixture had been obtained by evaporation of liquid hexahydrocoumarin and by mixing the vapor with hydrogen and nitrogen. The space velocity amounted to 0.14 gram of hexahydrocoumarin per ml. of catalyst per hour. As a catalyst, platinum on gamma-aluminum oxide (0.3% by weight of platinum, bulk density 1 gram per ml. obtained from Engelhard Industries Ltd.) in the form of tables (diameter 3.2 mm.) was used.

The resulting gaseous reaction mixture issuing from the tubular reactor was passed through a collecting vessel which had been cooled to approximately −20° C. with the aid of a mixture of carbon dioxide and acetone. After a period of 22, 143, 213, 310 and 500 hours, respectively, the quantity of hexahydrocoumarin passed through and the quantity of reaction product obtained were measured for 1 hour each time at as constant as possible a catalyst temperature. The quantity of hexahydrocoumarin passed through was measured by determination of the loss in weight of liquid hexahydrocoumarin. The quantity of reaction product obtained was measured by switching the collecting vessel to a small empty collecting vessel also cooled to −20° C. and by determining the increase in weight. The reaction product which had condensed during the measurings was analyzed using gas chromatography. The results of the measurings and the analyses are given in the following table. Efficiency as used herein indicates the quantity formed referred to the theoretical quantity that may be formed from the converted hexahydrocoumarin.

| Period (hours) | 22 | 143 | 213 | 310 | 50 |
| --- | --- | --- | --- | --- | --- |
| Catalyst temperature (° C.) | 277–281 | 278–283 | 279–285 | 292–285 | 284–290 |
| Conversion hexahydrocoumarin (percent) | 91 | 81 | 81 | 77 | 76 |
| Efficiency 3,4-di-hydrocoumarin (percent) | 62 | 68 | 68 | 70 | 66 |
| Efficiency coumarin (percent) | 3 | 3 | 4 | 4 | 6 |
| Efficiency 2-ethylphenol (percent) | 15 | 12 | 11 | 10 | 11 |

Example 2

In the same manner as in Example 1 a hexahydrocoumarin-containing gas mixture having 3.13 moles of hydrogen and 12.52 moles of nitrogen for every mole of hexahydrocoumarin was passed through the same tubular reactor for 48 hours. As a catalyst palladium on gamma-aluminum oxide in the form of tablets (0.5% by weight of palladium, bulk density 1 gram per ml., diameter 3.4 mm., obtained under the name of Deoxo-D from Engelhard Industries Ltd.) was used. The space velocity amounted to 0.22 gram of hexahydrocoumarin per ml. of catalyst per hour. After a period of 23 and 47 hours, respectively, measurings were carried out at a catalyst temperature of 200–203° C. in the same manner as in Example 1. Results of these measurements are given in the following table.

| Period (hours) | 23 | 47 |
| --- | --- | --- |
| Conversion hexahydrocoumarin (percent) | 99 | 95 |
| Efficiency 3,4-dihydrocoumarin (percent) | 62 | 66 |
| Efficiency coumarin (percent) | 0.5 | 0.5 |
| Efficiency 2-ethylphenol (percent) | 1 | 1 |

Example 3

In the same manner as in Example 1 a hexahydrocoumarin-containing gas mixture having 16.1 moles of nitrogen for every mole of hexahydrocoumarin was passed through the tubular reactor for 48 hours. The space velocity and the catalyst were identical to those of Example 2.

After a period of 4 and 47 hours, respectively, measurings were carried out in the same manner as in Example 1. The results are given in the following table.

| Catalyst temperature (° C.) | 200–202 | 200–203 |
| --- | --- | --- |
| Period (hours) | 4 | 47 |
| Conversion hexahydrocoumarin (percent) | 99 | 60 |
| Efficiency dihydrocoumarin (percent) | 68 | 67 |

EXAMPLE 4

In the same manner as in Example 1 a gaseous mixture of 6-methyl-hexahydrocoumarin, hydrogen and nitrogen (6.5 moles of hydrogen and 25.8 moles of nitrogen to every mole of 6-methyl-hexahydrocoumarin) was passed through the tubular reactor for 23 hours. The catalyst was identical to that of Example 1. The space velocity amounted to 0.13 gram per ml. of catalyst per hour. After a period of 4 and 22 hours, respectively, measurings were carried out in the same manner as in Example 1. The results are summarized in the following table.

| Period (hours) | 4 | 22 |
| --- | --- | --- |
| Temperature catalyst (° C.) | 276–280 | 276–280 |
| Conversion (percent) | 95 | 92 |
| Efficiency 6-methyl-3,4-dihydrocoumarin (percent) | 76 | 75 |
| Efficiency 2-ethyl-4-methylphenol (percent) | ca. 10 | ca. 10 |

What is claimed is:

1. Process for the preparation of compounds selected from the group consisting of dihydrocoumarin and alkyl substituted derivatives of dihydrocoumarin comprising heating to a temperature of about 150 to about 400° C. in the presence of a catalytc amount of a dehydrogenation catalyst selected from the group consisting of palladium, platinum, iridium, rhodium, nickel, cobalt or ruthenium, a compound of the formula:

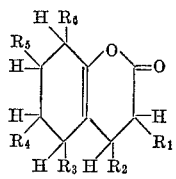

wherein each of $R_1$, $R_2$, $R_3$, $R_4$, $R_5$ and $R_6$ each independently represents hydrogen or a lower alkyl, provided that the total number of carbon atoms of the $R_1$–$R_6$ substituents is at most 10 and recovering said dihydrocoumarin compound from the reaction mixture.

2. The process according to claim 1 wherein hydrogen is also present when said compound is contacted with said catalyst.

3. The process according to claim 2 wherein the amount of hydrogen is from 1 to about 15 moles per mole of said starting compound.

4. The process according to claim 1 wherein said temperature is between about 175° C. and about 325° C.

5. The process according to claim 1 wherein said catalyst is selected from the group consisting of palladium, platinum and nickel, said catalyst contained on a catalyst carrier material.

6. The process according to claim 5 wherein said catalyst is palladium or platinum on an aluminum oxide catalyst carrier.

7. The process according to claim 1 conducted in a gaseous state in the presence of hydrogen and an inert, diluent gas, said process continued until about 40% to about 99% conversion of said compound is achieved.

8. In a process for the production of a compound selected from the group consisting of dihydrocoumarin and an alkyl substituted derivative thereof by heating in the presence of a dehydrogenation catalyst, the improvement comprising using, as the compound to be converted a compound of the formula:

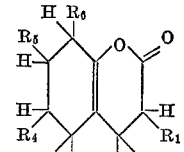

wherein each of $R_1$, $R_2$, $R_3$, $R_4$, $R_5$ and $R_6$ are each independently hydrogen or lower alkyl, provided that the total number of carbon atoms of the $R_1$–$R_6$ substituents is not more than 10, and recovering the dihydrocoumarin or alkyl substituted derivative thereof from the reaction mixture.

References Cited
UNITED STATES PATENTS

| | | | |
|---|---|---|---|
| 2,850,519 | 9/1958 | Krimm et al. | 260—464 |
| 3,442,910 | 5/1969 | Thweatt | 260—343.2 R |

JOHN M. FORD, Primary Examiner

U.S. Cl. X.R.

252—522